US008734873B2

(12) United States Patent
Boice et al.

(10) Patent No.: US 8,734,873 B2
(45) Date of Patent: May 27, 2014

(54) FOOD BAR WITH REDUCED HARDNESS (75) Inventors: Brooke C. Boice, Farmington, MN (US);
Sumiko Kanahori, Osaka (JP); **W.
Russell Egbert, Decatur, IL (US); Allan
W. Buck**, Decatur, IL (US)

(73) Assignee: Archer Daniels Medical Company,
Decatur, IL (US)

( * ) Notice: Subject to any disclaimer, the term of this patent is extended or adjusted under 35 U.S.C. 154(b) by 1853 days.

(21) Appl. No.: 11/099,146

(22) Filed: Apr. 5, 2005

(65) Prior Publication Data
US 2005/0226960 A1 Oct. 13, 2005

Related U.S. Application Data (60) Provisional application No. 60/560,104, filed on Apr. 7, 2004.

(51) Int. Cl.
*A23L 1/30* (2006.01)

(52) U.S. Cl.
USPC .............................. 426/72; 426/657; 426/661

(58) Field of Classification Search
USPC ......................................................... 426/72
See application file for complete search history.

(56) References Cited

U.S. PATENT DOCUMENTS

| 5,358,729 | A | | 10/1994 | Ohkuma et al. |
| 5,364,652 | A | | 11/1994 | Ohkuma et al. |
| 5,389,395 | A | | 2/1995 | Joseph et al. |
| 5,430,141 | A | | 7/1995 | Ohkuma et al. |
| 5,472,732 | A | | 12/1995 | Ohkuma et al. |
| 5,595,774 | A | * | 1/1997 | Leibfred et al. ............... 426/93 |
| 5,620,873 | A | | 4/1997 | Ohkuma et al. |
| 5,629,036 | A | | 5/1997 | Yanetani et al. |
| 6,241,983 | B1 | * | 6/2001 | Paul et al. ...................... 424/93.4 |
| 6,248,375 | B1 | * | 6/2001 | Gilles et al. .................... 426/72 |
| 6,299,929 | B1 | | 10/2001 | Jones |
| 6,432,457 | B1 | | 8/2002 | Jones |
| 7,220,442 | B2 | * | 5/2007 | Gautam et al. ................ 426/516 |
| 2002/0015761 | A1 | | 2/2002 | Prosise et al. |
| 2002/0187247 | A1 | | 12/2002 | Saniez |
| 2002/0197357 | A1 | * | 12/2002 | Pfeiffer ......................... 426/103 |
| 2004/0037905 | A1 | | 2/2004 | Bringe |

FOREIGN PATENT DOCUMENTS

| EP | 0 368 451 | 4/1994 |
| EP | 0368451 B1 | 4/1994 |
| WO | WO 01/67895 | 9/2001 |
| WO | WO 02/21937 | 3/2002 |
| WO | WO 2004/071207 | 8/2004 |
| WO | WO 2005/002366 | 1/2005 |

OTHER PUBLICATIONS http://dictionary.reference.com/browse/nonfat; dictionary.com; printed Mar. 13, 2009.*
International Search Report for International Application No. PCT/US2005/011587, European Patent Office (acting as International Searching Authority), 4 pp. (Jun. 28, 2005).
Written Opinion of the International Searching Authority for International Application No. PCT/US2005/011587, European Patent Office (acting as International Searching Authority), 8 pp. (Jun. 28, 2005).

* cited by examiner

*Primary Examiner* — Patricia George
(74) *Attorney, Agent, or Firm* — Mark W. Roberts (57) ABSTRACT

Methods are provided herein for producing a food bar with increased shelf life, by adding a softener, such as soluble fiber, highly branched carbohydrate, and/or indigestible or poorly digestible carbohydrate. Methods are also provided herein for producing food bars with increased protein content.

24 Claims, 3 Drawing Sheets

FOOD BAR WITH REDUCED HARDNESS

CROSS-REFERENCE TO RELATED APPLICATIONS

This application claims the benefit of U.S. Provisional Application No. 60/560,104, filed on Apr. 7, 2004, the entire teachings of which are incorporated herein by reference.

BACKGROUND OF THE INVENTION

Most food/nutrition/snack/energy bars (generally, "food bars") contain a significant amount of protein-containing ingredients. Typical protein-containing ingredients include soy and whey isolates, which differ in functional properties, such as emulsification, water-binding, and gel strength. Protein ingredients such as soy protein isolate, whey protein, sodium or calcium caseinate, whole milk protein, pea protein, egg albumin and wheat gluten, that exhibit significant viscosity, gel strength, and water-binding properties, positively influence initial texture of the bar.

Bars containing protein ingredients typically harden over their shelf life. Proteins that exhibit high water-binding properties are thought to positively influence the initial texture of the bar, but are believed to have the effect of firming the bar's texture over its shelf life. It is believed that the firming is not caused by water loss per se, but rather, by migration of the water from some ingredients to others, such as from the carbohydrate fraction to the protein fraction. This hardening or firming of the bars is generally thought to be the result of the dual cause of protein aggregation and the formation of crystalline-like structures by the carbohydrate fractions.

A variety of different carbohydrates, such as gums, maltodextrin, and cellulose derivatives, are added to nutrition/snack/energy bar formulations to hold moisture and to modify texture. While those ingredients may be somewhat effective in preventing moisture loss to the environment, their effectiveness in preventing moisture transfer to protein ingredients is minimal. Increasing the amount of carbohydrates, such as maltodextrin, that take on a crystalline-like form upon moisture loss, is believed to enhance the firming effect during shelf life.

SUMMARY OF THE INVENTION

A method is provided for increasing the shelf life of a food bar by adding a softener, preferably a highly branched carbohydrate, a soluble fiber, and/or indigestible or poorly digestible carbohydrate, to the food bar formulation. The addition of such a softener substantially maintains the texture of the bar through its shelf life. Preferably the softener is a highly branched carbohydrate. The softener can be highly branched FIBERSOL™-2(E), inulin, highly branched maltodextrin, fructooligosaccharides, polydextrose, or mixtures thereof.

A method also is provided for increasing the amounts of functional ingredients, such as protein, in a food bar by addition of such a softener to the food bar formulation. The method can therefore be used to produce, for instance, a high-protein food bar.

The addition of the softener to a food bar formulation extends shelf life and increases the initial softness of the bar after formulation. This increased initial softness allows for the addition of increased amounts of other ingredients, such as protein, thereby producing, for instance, a high protein food bar.

A food bar is provided which has increased shelf life, and includes a protein-containing ingredient, a carbohydrate-containing ingredient providing at least two carbohydrates and a softener. The food bar can be a non-fat food bar, and can include a protein-containing ingredient, a carbohydrate-containing ingredient and a softener. The food bar can have an increased protein content, where the protein makes up greater than 25% of the total ingredients. The protein can be soy protein. The carbohydrate-containing ingredient can be corn syrup, high fructose corn syrup, crystalline fructose, tagatose, sucrose, lactose, maltose, galactose, xylose, dextrose, cyclodextrins, trehalose, raffinose, stachyose, fructooligosaccharide, maltodextrins, starches, pectins, gums, carrageenan, inulin, or cellulose based compound, or various sugar alcohols, including sorbitol, mannitol, maltitol, xylitol, lactitol, isomalt, or erythritol. The carbohydrate-containing ingredient can contain at least two carbohydrates. Up to 30% of the total carbohydrate can be fructose. The softener can be highly branched FIBERSOL™-2(E), inulin, highly branched maltodextrin, fructooligosaccharides, polydextrose, or mixtures thereof. The softener can be about 0.1% to about 15% of the total weight of the food bar, about 1% to about 9% of the total weight of the food bar, or about 1.5% to about 6% of the total weight of the food bar. The softener can also be 20% or more of the carbohydrate in the food bar, or about 3% to about 20% of the carbohydrate in the food bar.

Also provided is a method of making a food bar with increased shelf life, by combining a protein-containing ingredient, a carbohydrate-containing ingredient providing at least two carbohydrates and a softener. A mixture is formed, and is then extruded and subdivided, or subdivided and baked, or subdivided and compressed into the desired shape. The subdivision and forming can be accomplished by extrusion and cutting, for instance, by subdividing the mixture into portions and compressing each portion to form the bar. The food bar can be a non-fat food bar, and can include a protein-containing ingredient, a carbohydrate-containing ingredient and a softener. The food bar can have an increased protein content, where the protein makes up greater than 25% of the total ingredients. The protein can be soy protein. The carbohydrate-containing ingredient can be corn syrup, high fructose corn syrup, crystalline fructose, tagatose, sucrose, lactose, maltose, galactose, xylose, dextrose, cyclodextrins, trehalose, raffinose, stachyose, fructooligosaccharide, maltodextrins, starches, pectins, gums, carrageenan, inulin, cellulose based compound, or various sugar alcohols, including sorbitol, mannitol, maltitol, xylitol, lactitol, isomalt, or erythritol. Up to 30% of the total carbohydrate can be fructose. The softener can be highly branched FIBERSOL™-2(E), inulin, highly branched maltodextrin, fructooligosaccharides, polydextrose, or mixtures thereof. The softener can be about 0.1% to about 15% of the total weight of the food bar, about 1% to about 9% of the total weight of the food bar, or about 1.5% to about 6% of the total weight of the food bar. The softener can also be 20% or more of the carbohydrate in the food bar, or about 3% to about 20% of the carbohydrate in the food bar.

Also provided is a food bar having increased shelf life, made by the method of combining a protein-containing ingredient, a carbohydrate-containing ingredient and a softener to form a mixture, and forming the food bar by forming the mixture into one or more slabs and subdividing the one or more slabs to produce the food bar, or by subdividing the mixture into portions and forming a portion to produce the food bar. The carbohydrate-containing ingredient can provide at least two carbohydrates. Protein can make up greater than 25% of the total ingredients. The protein can be soy protein. The carbohydrate-containing ingredient can be corn syrup, high fructose corn syrup, crystalline fructose, tagatose, sucrose, lactose, maltose, galactose, xylose, dextrose, cyclodextrins, trehalose, raffinose, stachyose, fructooligosaccharide, maltodextrins, starches, pectins, gums, carrageenan, inulin, or cellulose based compound, or various sugar alcohols, including sorbitol, mannitol, maltitol, xylitol, lactitol, isomalt, or erythritol. Up to 30% of the total carbohydrate can be fructose. The subdivision and forming can be accomplished by extrusion and cutting, for instance, by subdividing the mixture into portions and compressing each portion to form the bar. The softener can be highly branched FIBERSOL™-2(E), inulin, highly branched maltodextrin, fructooligosaccharides, polydextrose, or mixtures thereof. The softener can be about 0.1% to about 15% of the total weight of the food bar, about 1% to about 9% of the total weight of the food bar, or about 1.5% to about 6% of the total weight of the food bar. The softener can also be 20% or more of the carbohydrate in the food bar, or about 3% to about 20% of the carbohydrate in the food bar.

Food bars are provided containing 30-40% protein, 50-60% carbohydrate from at least two carbohydrates and 0.1-15% softener. Alternatively, the food bar can contain 30-40% protein, 0.1-15% softener and a carbohydrate-containing ingredient such as corn syrup, high fructose corn syrup, crystalline fructose, tagatose, sucrose, lactose, maltose, galactose, xylose, dextrose, cyclodextrins, trehalose, raffinose, stachyose, fructooligosaccharide, maltodextrins, starches, pectins, gums, carrageenan, inulin, cellulose based compound, or various sugar alcohols, including sorbitol, mannitol, maltitol, xylitol, lactitol, isomalt, or erythritol. The food bar can contain 30-40% protein, 0.1-15% softener, and 50-60% carbohydrate, where fructose is up to 30% of the total carbohydrate.

Any of the food bars described herein can be coated, such as with a compounded confectionary coating, a sugar-free compounded confectionary coating, a chocolate coating, a carob coating, or a yogurt coating. It can also include fruit, nuts, grains, confectionary pieces, extruded protein pieces, or other added ingredients. The protein can be soy protein. The food bar can also include added nutrients such as vitamin A, vitamin B, vitamin B2, vitamin B6, vitamin B12, vitamin C, vitamin D, vitamin E, vitamin K, biotin, carnitine, taurine, folic acid, pantothenic acid, niacin, choline, calcium, phosphorus, magnesium, zinc, manganese, copper, sodium, potassium, chloride, iron, selenium, chromium or molybdenum. It can also include ingredients with health benefits such as soy isoflavones, omega-3 fatty acids, sterols, or milled flax seed.

In any of the embodiments described herein, the softener can be highly branched FIBERSOL™-2(E), inulin, highly branched maltodextrin, fructooligosaccharides, polydextrose, or mixtures thereof. The softener preferably makes up about 0.1% to about 15% of the total weight of the food bar, more preferably makes up about 1% to about 9%, and most preferably about 1.5% to about 6% of the total weight of the food bar. The softener can also make up amounts within those ranges, namely, the softener can make up about 0.2%, 0.4%, 0.6%, 0.8%, 1.0%, 1.2%, 1.4%, 1.6%, 1.8%, 2.0%, 2.2%, 2.4%, 2.6%, 2.8%, 3.0%, 3.2%, 3.4%, 3.6%, 3.8%, 4.0%, 4.2%, 4.4%, 4.6%, 4.8%, 5.0%, 5.2%, 5.4%, 5.6%, 5.8% or 6.0% of the total weight of the food bar. The softener can also make up about 6.2%, 6.4%, 6.6%, 6.8%, 7.0%, 7.2%, 7.4%, 7.6%, 7.8%, 8.0%, 8.2%, 8.4%, 8.6%, 8.8% or 9.0% of the total weight of the food bar. The softener can also make up about 9.2%, 9.4%, 9.6%, 9.8%, 10.0%, 10.2%, 10.4%, 10.6%, 10.8%, 11.0%, 11.2%, 11.4%, 11.6%, 11.8%, 12.0%, 12.2%, 12.4%, 12.6%, 12.8%, 13.0%, 13.2%, 13.4%, 13.6%, 13.8%, 14.0%, 14.2%, 14.4%, 14.6%, 14.8% or 15.0% of the total weight of the food bar.

In any of the embodiments listed herein the protein can make up about 30% to about 40% of the total ingredients in the food bar. For instance, the protein can make up about 30.0%, 30.2%, 30.4%, 30.6%, 30.8%, 31.0%, 31.2%, 31.4%, 31.6%, 31.8%, 32.0%, 32.2%, 32.4%, 32.6%, 32.8%, 33.0%, 33.2%, 33.4%, 33.6%, 33.8%, 34.0%, 34.2%, 34.4%, 34.6%, 34.8%, 35.0%, 35.2%, 35.4%, 35.6%, 35.8%, 36.0%, 36.2%, 36.4%, 36.6%, 36.8%, 37.0%, 37.2%, 37.4%, 37.6%, 37.8%, 38.0%, 38.2%, 38.4%, 38.6%, 38.8%, 39.0%, 39.2%, 39.4%, 39.6%, 39.8%, or 40.0% of the total weight of the food bar.

In any of the embodiments listed herein the carbohydrate can make up about 50% to about 60% of the total ingredients in the food bar. For instance, the can make up about 50.0%, 50.2%, 50.4%, 50.6%, 50.8%, 51.0%, 51.2%, 51.4%, 51.6%, 51.8%, 52.0%, 52.2%, 52.4%, 52.6%, 52.8%, 53.0%, 53.2%, 53.4%, 53.6%, 53.8%, 54.0%, 54.2%, 54.4%, 54.6%, 54.8%, 55.0%, 55.2%, 55.4%, 55.6%, 55.8%, 56.0%, 56.2%, 56.4%, 56.6%, 56.8%, 57.0%, 57.2%, 57.4%, 57.6%, 57.8%, 58.0%, 58.2%, 58.4%, 58.6%, 58.8%, 59.0%, 59.2%, 59.4%, 59.6%, 59.8%, or 60.0% of the total weight of the food bar.

DETAILED DESCRIPTION OF THE INVENTION

Methods are provided herein for increasing the shelf life of a food bar by substantially maintaining the texture of the bar through its shelf life. The methods include adding a softener, preferably in the form of highly branched carbohydrate soluble fiber, and/or indigestible or poorly digestible carbohydrate, to a food bar formulation to increase the initial softness of the bar, and also decrease the extent to which the firmness increases over time. Preferably the softener is a highly branched carbohydrate. "Soluble indigestible carbohydrate fiber" is a water soluble fiber of industrial manufacture or extracted from plants comprised mainly of a short chain polysaccharide typically having less than 50 and more typically less than 25 sugar residues with some residues bonded in glycosidic linkages that are not 1-4 or 1-6 linkages so that the fiber is not fully digestible by a human. Not limiting generic examples include, inulins, polydextroses, fructo-oligosacchrides, and highly branched carbohydrates. "A highly branched carbohydrate" is a soluble carbohydrate fiber derived from starch by treating the starch to chemical and/or enzymatic hydrolysis under conditions that result in a short chain polysaccharide having a portion of glycosidic linkages that are not 1-4 or 1-6 linkages. Commercially available examples include indigestible maltodextrins available from Roquette (France) with the term "Nutriose" in the tradename, and those available from Matsutani Chemical Company or Archer Daniels Midland Company (Decatur, Ill.) with the term "Fibersol" in the tradename. As used herein, the terms "Fibersol," "Fibersol-2," and "Fibersol-2(E)" are synonymous and refer to the indigestible maltodextrin material commercially available from Matsutani Chemical Industry Company, Ltd. (Itami City, Hyogo, JP) or Archer Daniels Midland Company (Decatur, Ill., USA). The terms "Fibersol," "Fibersol-2," and "Fibersol-2(E)" are trademarks of Matsutani Chemical Industry Company, Ltd.

One advantage of the invention is that increased initial amounts of certain functional ingredients, such as, without limitation, protein, can be added to the bar without reducing the shelf-life of the bar. That is, addition of the softener to a food bar formulation according to the present invention increases the initial softness of the bar, allowing increased protein to be added to the formulation without negatively affecting the softness of the bar over the shelf life of the bar. The addition of the softener therefore can be used to produce a high-protein food bar.

The "food bar" of the present invention refers to a food product that is eaten by a consumer as a snack or as a meal replacement. The bar can be considered as a confection or as a nutritional supplement. "Bar", "food bar", "nutrition bar", "nutritional bar", "snack bar", "energy bar" and "meal replacement bar" are therefore intended to be used interchangeably and in a non-limiting manner. Food bars typically are prepared from a mixture of ingredients, the mixture typically is extruded into bar-shaped products, or the mixture is subdivided into portions and then compressed into bars-shaped products. The "food bar" can be formed in any shape. Typically the food bar is extruded as a bar having any shape of cross-section, for example and without limitation, a cylinder, an elliptic cylinder, a brick-shape or a trapezoidal shape. Alternatively, the food bars can be formed and baked.

However, the food bar can also be "snack sized", or "bite sized," that is, smaller than what might normally be considered to be a food bar. For instance, the food bar can be indented or perforated to allow the consumer to break off smaller portions for eating, or the food "bar" can be small pieces, rather than a long, bar-shaped product. The smaller pieces can be individually coated or enrobed. They can be packaged individually or in groups.

The food bar can include solid material, that is, material that is not ground to a homogeneous mass, such as, without limitation, whole or chopped nuts, grains, confectionary pieces (such as, but not limited to, chocolate, or butterscotch pieces or chips), or substitutes thereof (such as, but not limited to, sugar-free confectionary pieces, carob, yogurt), or fruit, including dried, preserved or candied fruit or fruit paste, or extruded protein pieces in the form of flakes, granules or nuggets such as high protein rice crisps.

The food bars can be coated or enrobed, such as, and without limitation, with chocolate, including dark, light, milk or white chocolate, carob, yogurt, other confections, nuts or grains. The coating can be a compounded confectionary coating or a non-confectionary (e.g., sugar free) coating. The coating can be smooth, or can contain solid particles or pieces.

After processing is finished, the bars are wrapped in a suitable food-grade wrapping, such as, but not limited to, air-tight foil or plastic wrapping.

A food bar is made from ingredients, which are components which are combined together in accordance with a recipe or formulation. Ingredients may be altered or re-formulated during the preparation of the food bar, and are typically listed on the packaging of the finished product.

A "protein-containing ingredient" is added to the formulation primarily for the purpose of adding protein to the food bar. Likewise, a "carbohydrate-containing ingredient" is used to add carbohydrate to the finished product or as a functional ingredient used to hold other bar components together. Some ingredients may contain more than one constituent, for instance, an ingredient may contain both protein and carbohydrate. Such an ingredient would be considered both a protein-containing ingredient and also a carbohydrate-containing ingredient.

Generally, a food bar includes one or more protein ingredients and one or more carbohydrate ingredients. Vitamins, minerals and other beneficial nutrients also can be added, including functional ingredients, that is, ingredients intended to be produce specific benefits to a person consuming the food bar. Examples of functional ingredients include, without limitation, omega-3 fatty acids, isoflavones, sterols and beta-carotene. Such functional ingredients can be included in the form of plant extracts or concentrates. For instance, omega-3 fatty acids can be added to the food bar formulation by adding flax flour or linseed oil. Isoflavones can be added by including soy flour or a more concentrated ingredient such as NovaSoy (Archer Daniels Midland, Decatur, Ill., USA). Beta-carotene can be added as a vitamin, or as carrot pieces or juice.

A food bar also can include additives such as, but not limited to, flavorings, colorings, emulsifiers, preservatives and other ingredients intended to achieve a particular flavor, color, texture and shelf life. Additives also are added to ease manufacturing, such as to ease the extrusion of an product made by extrusion, for instance, or to cause a product to hold its shape. Some ingredients can be included that perform more than one of these functions.

Generally, the protein-containing ingredients can include a mixture of "binding" protein and "filler" protein. Both binding and filler proteins should exhibit low water absorption. Binding proteins should also exhibit medium to high emulsification properties, while filler proteins should exhibit low viscosity. Suitable "binding" proteins include, without limitation, soy protein isolate, whey protein, whole milk protein, pea protein, egg albumen, wheat gluten or combinations thereof. Suitable "filler" proteins include, without limitation, calcium caseinate, soy protein, whey protein, pea protein, wheat gluten, egg albumen or combinations thereof. Other proteins may have limited nutritional value, while other have superior nutritional value. Some proteins may be useful, however, some proteins should not be used, or should not be used alone, because they impart a distinctive flavor which may or may not be desirable in the finished product. Some proteins may be more desirable in one form than another. For instance, some commercially available soy protein additives may impart an undesirable "beany" taste to the finished product, while other soy protein additives do not. One of ordinary skill in the food processing arts will be able to choose appropriate ingredients to formulate the food bar. Such characteristics, along with cost, will affect the choice of ingredient materials. In referring to food bar formulations, a "protein-containing ingredient," a "source of protein" or "protein source" is therefore one or more ingredients that contain protein, and provide protein content to the finished food bar product. The protein material incorporated into the food bar may be added as a solid, as dry material, or as a concentrated solution according to methods known in the art.

The carbohydrate-containing ingredient can provide carbohydrates such as, but not limited to, glucose, sucrose, fructose, dextrose, tagatose, lactose, maltose, galactose, xylose, xylitol, dextrose, polydextrose, cyclodextrins, trehalose, raffinose, stachyose, fructooligosaccharide, maltodextrins, starches, pectins, gums, carrageenan, inulin, cellulose based compounds, sugar alcohols, sorbitol, mannitol, maltitol, xylitol, lactitol, isomalt, erythritol, pectins, gums, carrageenan, inulin, hydrogenated indigestible dextrins, hydrogenated starch hydrolysates, highly branched maltodextrins, starch and cellulose.

The carbohydrate material in the food bar provided herein can include digestible carbohydrate (such as, but not limited to, glucose, sucrose, fructose, dextrose, lactose, maltose and starch). Carbohydrate-containing ingredients that can serve as sources of digestible carbohydrates include for example, but are not limited to, honey, glucose-fructose syrup, sucrose, cocoa butter, high-fructose corn syrup, peanut butter, nuts, maltodextrins, isomaltulose, maltitol syrups, sorbitol syrups and mixtures thereof.

The carbohydrate material in a food bar made according to the present invention can include indigestible (or poorly or slowly digestible) carbohydrate, such as, but limited to, polydextrose, xylose, xylitol, sorbitol, cyclodextrins, trehalose, raffinose, stachyose, fructooligosaccharide, maltose, pectins, gums, carrageenan, inulin, hydrogenated indigestible dextrins, hydrogenated starch hydrolysates, highly branched maltodextrins and cellulose. These polymers are only partially metabolized in the human body. Most of the product passes through the body unabsorbed, and the principal utilization pathway for the remainder involves metabolism by intestinal micro-organisms to form carbon dioxide and volatile fatty acids. Those acids may then be absorbed and utilized as an energy source.

The carbohydrate material may be added as a solid, as dry material, or as a concentrated solution.

It is to be understood that the terms denoting a carbohydrate and its source (e.g., "carbohydrate-containing ingredient", "fructose", "source of fructose", "fructose source") are used interchangeably herein and refer to the actual carbohydrate content in an ingredient. Commercially available sources of various carbohydrates and their specifications are known, or can be ascertained easily, by those of ordinary skill in the art of processed food formulation. For instance, commercially available fructose sources contain various levels of fructose, and frequently state their fructose profiles, e.g., "HFCS 42" denotes high fructose corn syrup with a fructose content of 42%, 35% dextrose, and the remainder water. "HFCS 55" has a content of 55% fructose.

Any reference to a quantity of carbohydrate should be understood as referring to the actual carbohydrate content within the carbohydrate-containing ingredient. For example, 100 gm of honey generally provides 49 gm of fructose, and one skilled in the art can readily calculate how much of this ingredient should be added to the products described herein in order to deliver the desired amount of fructose. Commercial sources for such carbohydrate sources are readily available and known to those practicing the art. For example, various high fructose corn syrups are available from Archer Daniels Midland in Decatur, Ill., USA, or Cargill in Minneapolis, Minn., USA.

In speaking of food bar formulations, "an ingredient containing at least two carbohydrates" does not necessarily mean that a single ingredient must provide two or more different carbohydrates, but rather, that multiple carbohydrate sources can be used, or sources containing different carbohydrates can be combined to provide an overall carbohydrate content containing multiple carbohydrates. For instance, honey (providing fructose) and sugar (providing sucrose) can be combined in a food bar formulation according to the invention to make up a source of at least two carbohydrates. Alternatively, corn syrup alone can be used as a source of at least two carbohydrates. "Low DE corn syrup" (i.e., Dextrose Equivalent corn syrup) refers to a corn syrup of a lower sweetness intensity due to its being high in maltose and other higher saccharides that does not taste as sweet as fructose or sucrose. These are usually preceded by a number that refers to the dextrose equivalent. In general, the higher the dextrose equivalent, the sweeter the corn syrup. For example, "42DE" (i.e., Dextrose Equivalent) corn syrup would have a relative sweetness 45 to 50% of that of sucrose. A corn syrup designated as 62/43 will have a Dextrose Equivalent (DE) of 62 and a Baume reading at 100° F. of 43. The sugar profile can consist of glucose (dextrose) 36%, maltose 31%, trisaccharides 13% and higher saccharides 20%. It would have a relative sweetness 60 to 70% of that of sucrose. The relative sweetness of the sugars is given as: sucrose: 1.0; glucose: 0.5 to 0.6; fructose: 1.4; maltose: 0.3. The sweetness intensity of corn syrup is further lowered by lowering the corn syrup's original Brix from about 82 Brix to as low as about 40 Brix, in some cases by diluting with water.

The food bars according to the present invention have the advantage of having an increased shelf life, relative to food bars not made according to the invention. A product's "shelf life" is its commercially viable life-span, after which the product is unfit or undesirable for sale and/or consumption. Currently, hardening of the texture of food bars over time is a problem, even when wrapped in moisture-tight packaging, resulting in a shortened shelf life. The texture of the food bars of the present invention at any given point in time during the shelf life of the product are substantially similar to the texture of the food bars when first produced, relative to food bars not made according to the invention. A food bar with an increased shelf life according to the invention is therefore a food bar that exhibits reduced hardening over time.

The desired initial texture of the food bar likely is to be driven by several considerations, including consumer preference and mechanical formulation. For instance, a soft texture may be desired, but a texture that is too soft might be difficult or messy for consumers to eat, may be too soft to be coated (that is, the bar may deform and crack the coating), or may be difficult to manufacture. Likewise, if the bar is to be formed by an extrusion process, the texture may need to be within a range that can be handled by the extrusion machinery. Compression forming may not have such requirements, or may have different requirements. One of ordinary skill in the art of food processing will know how to adjust the types, forms and amounts of the food bar ingredients to produce a food bar product of the desired texture.

However, because it has been found that, according to the present invention, the addition of the softener to a food bar formulation causes a softer initial texture, it should be understood that some experimentation is likely to be required in re-formulating previously-known food bar formulations in order to both include the softener according to the invention, yet also achieve the desired firmness of texture that was characteristic of the product before its reformulation. Such experimentation is simple and well within the level of ordinary skill of those in the food sciences.

The "softener" as described herein can be a highly branched carbohydrate, a soluble fiber, and/or an indigestible or poorly digestible carbohydrate. Preferably, the softener is a highly branched carbohydrate, such as indigestible dextrin (e.g., highly branched FIBERSOL™-2(E), inulin, or branched maltodextrin (e.g., Lodex 10). The softener can make up between about 0.1% to about 15% or more of the total weight of the ingredients of the food bar. Preferably the softener makes up about 1% to about 9% of the food bar, more preferably about 1.5% to about 6% of the total weight of the ingredients of the food bar.

"Soluble fiber" refers to a carbohydrate that is not absorbed, or is only slowly or partially absorbed, in the human gut. Such carbohydrates are called "soluble" fiber because of their solubility and low absorption. Examples of soluble fiber include fructooligosaccharides, modified starches, cellulose compounds, such as methylcellulose and ethylcellulose, and naturally-occurring soluble fibers such as inulin, psyllium husk and glucomannan. Natural gums such as gum arabic, carrageenan, guar gum, locust bean gum, xanthan gum and pectin are also naturally-occurring sources of soluble fiber. Gums are usually added to food products at a rate of 1% or less, but this can be increased according to the invention described herein.

Inulins are heterogeneous β(2-1) fructans, and are polymers of fructose units, usually terminating in a glucose. The linear fructose polymers are linked by β(2-1) bonds. The terminal glucose units are linked by an α(1-2) bond. Inulin is major storage food in the roots of members of the Compositae, such as dandelion, elecampane, chicory, Jerusalem artichoke and the Chinese herb codonopsis, and also in leek and asparagus. Inulin has a mildly sweet taste, but is not substantially digested or absorbed when taken orally, and sometimes is used as a constituent in food formulations for diabetics for this reason. Inulin is fermented by lactobacilli such as *Lactobacillus bifidobacteria* in the bowel and is used to maintain populations of intestinal microflora and increase gut health. Lactobacilli digest inulin, producing short chain fatty acids including acetic acid, propionic acid and butyric acid. There is some evidence that inulin and butyric acid can prevent cancer and pre-cancerous changes in the colon, and inulin therefore can be viewed as a desirable functional food ingredient in its own right.

Glucomannan is isolated from the tuber of the konjac plant, and is the most viscous of the naturally-occurring soluble fibers, and has the highest water-holding capacity.

"Highly branched carbohydrate" refers to a carbohydrate in which the glycosidic linkages have been randomized to the extent that those linkages are indigestible or are only partially digestible by conventional amylases and glucosidases. Such highly branched carbohydrates can be produced by treatment of starch with heat, acids or enzymes.

"Indigestible carbohydrate" or "poorly digestible" carbohydrate refer to carbohydrate moieties that are resistant to endogenous digestion in the human upper digestive tract. Indigestible or poorly digestible carbohydrates possess many of the characteristics of total dietary fiber. However, they are not necessarily quantifiable by the industry-standard MCC Method 32-07 for determining fiber content and, consequently, they are usually not included in dietary fiber totals.

Modified starches are one form of soluble fiber that is not digested, or is digested at a low rate. Starch, including straight and branched-chain starches, can be modified to change its rate and degree of digestion in the small intestine. Partial hydrolysis of starch using combinations of enzymes, heat and/or acid can result in molecular rearrangement of the starch molecule so that alpha and beta-(1,2) and -(1,3) linkages are formed, and alpha-(1,4) and -(1,6) bonds are changed into beta bonds. To make such a modified starch, corn starch can be treated in this way to produce a low molecular weight indigestible dextrin (e.g., highly branched FIBERSOL™-2 (E), distributed by Matsutani Chemical Industry, Hyogo, Japan; "highly branched FIBERSOL™-2(E)", "highly branched FIBERSOL™-2" and "highly branched FIBERSOL™" are intended to be synonymous). Such a modified starch has a slow rate of fermentation and is more likely to reach the lower part of the large intestine and be digested by lactobacilli.

Therefore, in speaking of "soluble fiber", "highly branched carbohydrate", and "indigestible carbohydrate" or "poorly digestible carbohydrate", it is to be understood that these classes are not mutually exclusive, that is, some individual compounds may fall into more than one of these classes. For instance, the compound sold under the trade name "highly branched FIBERSOL™-2(E)" is a soluble fiber and also is highly branched. Due to its highly branched structure and relatively low number of alpha 1-4 linkages, it also is indigestible or poorly digestible.

As shown in Examples 1 and 2, below, the addition of highly branched FIBERSOL™-2 in basic bar formulations decreases the rate of texture firming. Highly branched FIBERSOL™-2 is shown to have a softening effect on initial bar texture. Example 1 shows that highly branched FIBERSOL™-2(E) permits the incorporation of more protein to obtain optimum formability, without negatively affecting texture throughout the shelf-life of the bar. Because the soy protein isolate used in Example 1 exhibits moderate to high functional characteristics, the amount of additional protein or other solids that can be added to a food bar formulation, without significantly changing the rate of firming, may be quite significant.

Example 2 compares bar firmness when 10 DE maltodextrin (control) is added, versus firmness of bars when highly branched FIBERSOL™-2(E) is added. Bars with highly branched FIBERSOL™-2(E) were much softer than those made with 10 DE maltodextrin, so much so that extra protein needed to be added in order for the bar to hold its shape during forming and storage. Therefore, Example 2 illustrates that the incorporation of 10 DE maltodextrin to the bar model base limits the amount of protein ingredients that can be added in order to achieve a workable, formable bar base. With the addition of highly branched FIBERSOL™-2(E), however, more protein could be added without losing the desired textural attributes. Example 1 shows that the bars prepared with highly branched FIBERSOL™-2(E) will not show a significantly greater rate of change in hardness relative to bars without highly branched FIBERSOL™-2(E) that have the same protein to moisture content. Because 10DE maltodextrin is more apt to form crystalline-like structures than highly branched FIBERSOL™-2(E), bar bases made with 10DE maltodextrin exhibit a greater change in hardness than those made with an equal amount of highly branched FIBERSOL™-2(E).

Example 3 compares bar firmness for a soy-dairy bar formulation made with varying amounts of 10 DE maltodextrin, highly branched FIBERSOL™-2(E), fructooligosaccharide, inulin, polydextrose, and branched maltodextrin (Lodex 10). Highly branched FIBERSOL™, inulin and Lodex 10 minimized bar hardening when included in bars stored for 12 months. Fructooligosaccharide and polydextrose also reduced hardening, but the bars were initially very soft and bar manufacture was difficult. However, bar formulations could be modified to account for the extreme bar softness resulting from the addition of fructo-oligosaccharides or polydextrose.

According to the present invention, the addition of a softener to the food bar formulations extends the softness of the bar for a longer period of time relative to food bar formulations not containing the softener. High-protein food bars therefore can be prepared having extended shelf lives.

The addition of the softener according to the present invention also has the effect of softening the texture of the bar. However, this softening then creates "headroom" in the bar formulation for the addition of ingredients (such as protein) that normally would have the effect of hardening the bar texture. The protein content therefore can be increased to the point where the texture is firmed back up to the desired level.

In formulating a food bar intended to be a "high protein" food bar, it is preferred that it have a protein content of 25% to 40% of the total ingredients by weight.

From the above, in any instance where the addition or increase of a desired ingredient normally is prevented due to an unacceptable associated increase in bar hardness, a softener can be added according to the invention to soften the texture, thereby permitting inclusion of greater amounts of the desired functional ingredients.

In one embodiment, a "diet bar" can be made by adding a softener to the bar. When added alone, the softener would have the effect of softening the texture of the bar. This allows "room" for the addition of additional ingredients or other ingredients that would normally harden the bar, such as insoluble indigestible carbohydrate, insoluble slowly-digestible carbohydrate, insoluble dietary fiber, and/or other ingredients that would serve to lessen or delay onset of hunger pangs in the person consuming the bar.

The method of the invention likewise allows the addition of functional ingredients that would normally be considered too "bulky" to be added to a food bar. For instance, "herbal" bars can be made according to the invention, where the addition of a softener to the formulation allows the inclusion of "natural" or "whole foods" ingredients that are less highly processed, such as coarsely chopped plant material, crushed grains and nuts, or other bulky, dry, or even hygroscopic materials.

EXAMPLES

Example 1

Food Bar with Increased Shelf Life

The addition of a softener such as, but not limited to, highly branched FIBERSOL™-2 to food bar formulations have the ability to cause softening of the bar texture, both initially after production and also during shelf-life. A texture study was therefore conducted by incorporating highly branched FIBERSOL™-2 into a bar model formulation. Profam 825 is an isolated soy protein product (by definition 90% protein on dry basis).

TABLE A

Control Bar Formulation.

| % of total | Ingredient |
|---|---|
| 36.49 | Soy Isolate (Pro-Fam ™ 825) |
| 31.26 | HFCS 42 |
| 31.26 | 42/43 DE corn syrup |
| 0.27 | Lecithin Beakin LV3 |
| 0.72 | Sunflower Oil (Nu-Sun) |
| 100.00% | Total |

TABLE B

Soluble Fiber Bar Formulation.

| % of total | Ingredient |
|---|---|
| 35.59 | Soy Isolate (Pro-Fam ™ 825) |
| 5.77 | Highly branched FIBERSOL ™-2 |
| 28.85 | HFCS 42 |
| 28.85 | 42/43 DE corn syrup |

TABLE B-continued

Soluble Fiber Bar Formulation.

| % of total | Ingredient |
|---|---|
| 0.27 | Lecithin Beakin LV3 |
| 0.67 | Sunflower Oil (Nu-Sun) |
| 100.00% | Total |

Bar Production Method:

Pre-heat corn syrup in microwave on high for 30 seconds (to about 120° F.).

Place HFCS and corn syrup in bowl of Kitchen-Aid Mixer™.

Add lecithin and oil to syrups.

Using paddle attachment mix for 30 seconds on speed 2.

Gradually add one-third of isolate; mix until thoroughly incorporated. Scrape; add second third of isolate; mix thoroughly. Scrape; add remaining isolate and mix for 2 minutes.

Form 40 gm increments of base into bar-shapes with the following approximate dimensions: 7.5 cm by 5.5 cm by 1.0 cm (length×width×height).

Package and seal in metallized polyethylene material.

Texture Analysis Method:

A Texture Analyzer (TA-XT Plus, Stable Microsystems, Ltd., Godalming, Surrey, UK) with 5 cm wide blade was used.

Each sample was placed on a platform for measurement to prevent texture softening from the heat of the instrument.

Three measurements of each treatment sample were evaluated by mode of compression using the settings listed below.

Pre-test speed—2.0 mm/sec
Test speed—2.0 mm/sec
Post-test speed—10.0 mm/sec
Strain—30%/80%
Trigger Force—5 g (Auto)
Break Mode—Off
Stop Plot at Start Position
Tare Mode—Auto When highly branched FIBERSOL™-2 was added at 5.7% (based on total) to the isolate bar base, the texture was softer than that of the Control Bar, which had a lower solids content. An additional 2% soy isolate therefore was added to the formulation to increase the firmness and to improve bar formability.

Even with the increased solids-to-moisture ratio, the highly branched FIBERSOL™-2 bar exhibited an initial maximum force measurement of 2.56±0.04 kg, whereas the isolate bar model without highly branched FIBERSOL™-2 exhibited a value of 8.42±0.98 kg. After six months, the bar model with highly branched FIBERSOL™-2 exhibited a maximum force of 29.32±1.41 kg, and the bar model without highly branched FIBERSOL™-2 exhibited a value of 34.89±1.57 kg. Both bar models exhibited approximately the same change in hardness after six months, despite the higher solids content of the highly branched FIBERSOL™-2 bar.

Example 2

High Protein Food Bar

To study the differences between extending shelf life by addition of soluble fiber versus the addition of maltodextrin, comparisons of 10DE maltodextrin and highly branched FIBERSOL™-2 in a bar model system were conducted. 10DE maltodextrin was replaced 1:1 by highly branched FIBERSOL™-2 in two different protein ingredient bar model systems. The first model system was a combination of dairy proteins (whey protein and caseinate). The second model system was the combination of soy and the two dairy proteins. Total protein was 36% in the two formulations. 10 DE maltodextrin or highly branched FIBERSOL™-2 was used at 9%. The second model system was repeated for milk proteins from two different sources (FarBest Brands, Louisville, Ky., USA, and NZMP, Auckland, New Zealand).

In measuring texture, two replicates per treatment were measured, and strain was set at 40%.

TABLE C

Dairy Protein Bar Formulation.

| % of total | Ingredient |
|---|---|
| 9.03 | 10 DE maltodextrin or highly branched FIBERSOL ™-2 |
| 18.05 | Whey protein isolate |
| 9.03 | Calcium caseinate |
| 9.03 | Whey protein Concentrate |
| 37.36 | 62 DE corn syrup |
| 16.59 | HFCS 42 |
| 0.91 | Lecithin Beakin LV3 |
| 100.00% | Total |

TABLE D

Soy and Dairy Protein Bar Formulation.

| % of total | Ingredient |
|---|---|
| 9.09 | 10 DE maltodextrin or highly branched FIBERSOL ™-2 |
| 14.50 | Soy Isolate (Pro-Fam ™ 825) |
| 10.90 | Whey protein isolate |
| 5.45 | Calcium caseinate |
| 5.45 | Whey protein concentrate |
| 36.94 | 62 DE corn syrup |
| 16.73 | HFCS 42 |
| 0.94 | Lecithin Beakin LV3 |
| 100.00% | Total |

Bar Production Method:

Pre-mix 62 DE corn syrup and HFCS 42 in Kitchen-Aid™ Mixer on speed 1 for 15 seconds.

While mixing on speed 1, add Beakin LV3 to corn syrup mixture; mix for 30 seconds.

Add one-third of protein/maltodextrin mixture; mix on speed 2 for 30 seconds; scrape; add second-third of protein mixture; mix for 30 seconds; scrape; add remaining part of protein mixture; mix for 30 seconds and scrape, and mix for an additional 1 minute at speed 2.

Put in Ziplock™ bag and place in the cooler for 30 minutes.

Form 40 gm increments of based into bar-shapes with the following approximate dimensions; 7.5 cm by 5.5 cm by 1.0 cm (length×width×height).

Package and seal in metallized polyethylene material.

In both bar formulations, the highly branched FIBERSOL™-2 bar model bases were subjectively determined to exhibit a softer texture immediately after make-up. The 10DE maltodextrin bar exhibited an initial maximum force measurement of 2.00±0.21 kg, whereas the highly branched FIBERSOL™-2 bar exhibited a value of 0.73±0.03 kg in the dairy protein bar model system. In the soy and dairy protein bar model system, 10 DE maltodextrin bar exhibited a value of 2.96±0.12 kg, whereas the highly branched FIBERSOL™-2 bar exhibited a value of 1.85±0.17 kg.

Follow-up maximum force measurements were conducted to evaluate the texture changes in the 10DE maltodextrin and highly branched FIBERSOL™-2 bar models on a month-to-month basis. The results are shown in Table E, below, and in FIGS. 1, 2 and 3. In Table E, E1, E2 and E3 refer to the dairy bar formulation of Table C (E1) and the soy-dairy bar formulation of Table D, made with the FarBest dairy products (E2) and the NZMP dairy products (E3). T1 and T2 refer to the 10DE bars (T1) and the highly branched FIBERSOL™-2 bars (T2).

Figure 1:
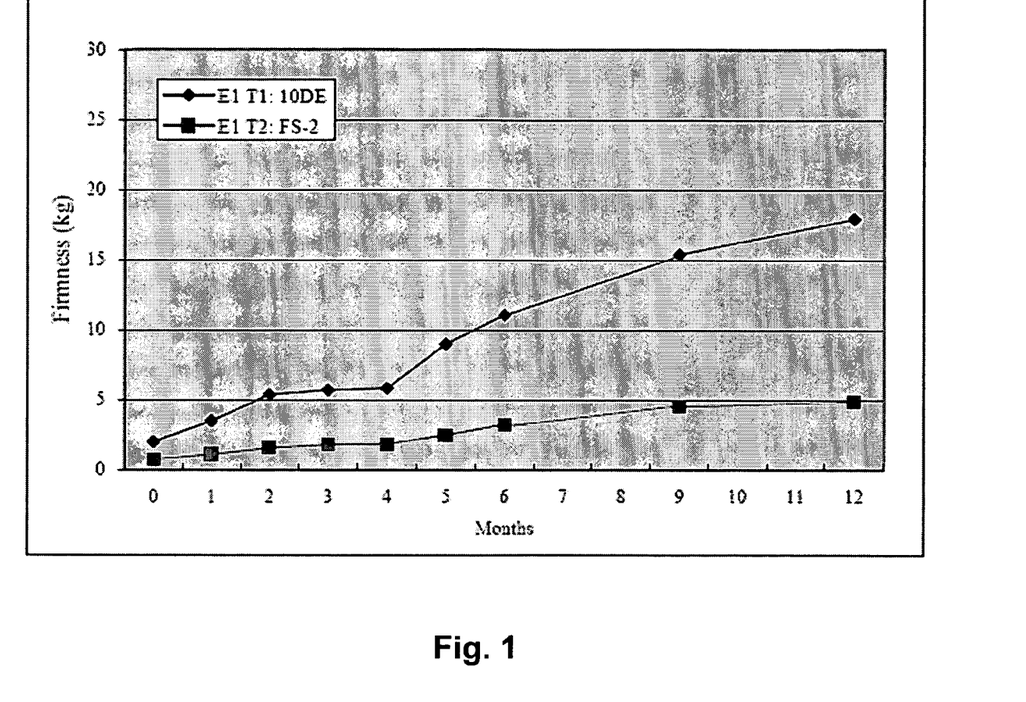
FIG. 1 is a graph showing the increase in firmness (y-axis) over time (x-axis) for bars made with dairy protein and either 10 DE maltodextrin (♦) or highly branched FIBERSOL™-2 (■).
Figure 2:
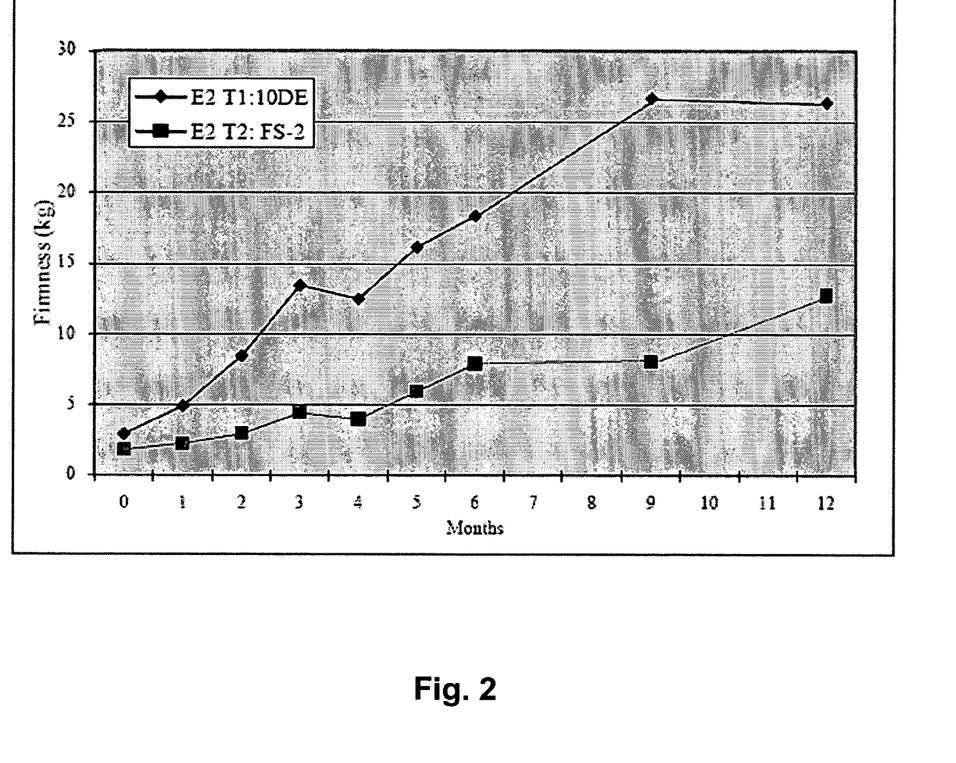
FIG. 2 is a graph showing the increase in firmness (y-axis) over time (x-axis) for bars made with a blend of soy protein and dairy protein and either 10 DE maltodextrin (♦) or highly branched FIBERSOL™-2 (■).
Figure 3:
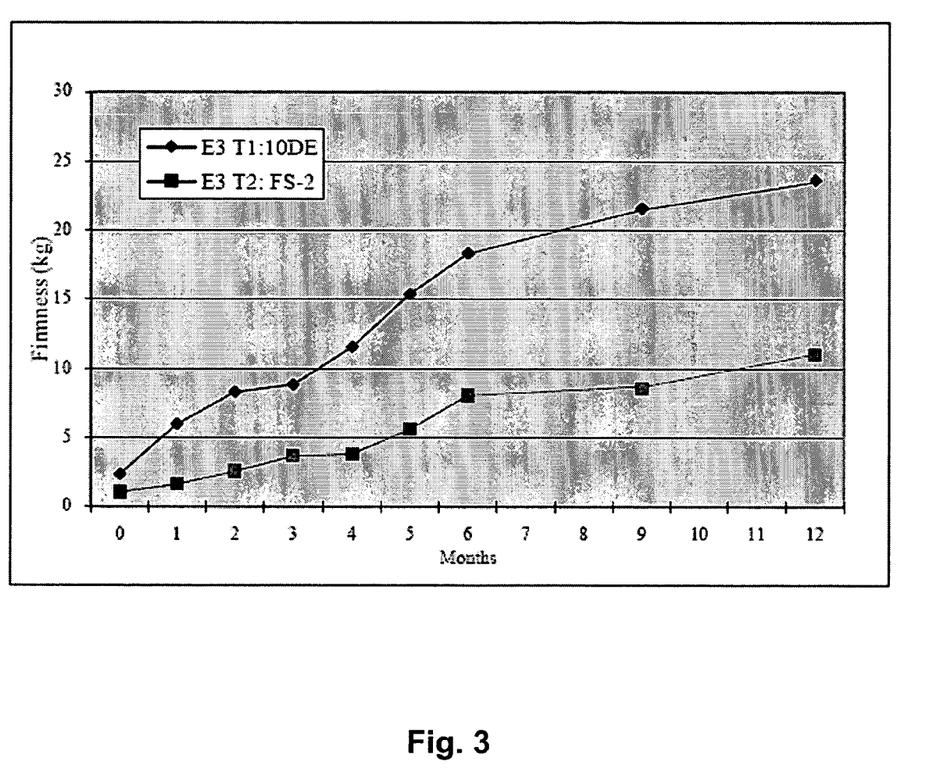
FIG. 3 is a graph showing the increase in firmness (y-axis) over time (x-axis) for bars made with a blend of soy protein and dairy protein and either 10 DE maltodextrin (♦) or highly branched FIBERSOL™-2 (■).

Table E shows that firmness in kilograms force increased over time for the control bars made with 10 DE maltodextrin, while the firmness for the highly branched FIBERSOL™-2 bars also increased, but not nearly to the extent of the control bars. Table E and FIGS. 1-3 show that the bars made with milk proteins from two different sources behaved similarly (FIGS. 2 and 3). Hardening over time was reduced in the bars containing highly branched FIBERSOL™-2, and the effect was enhanced in the dairy protein bars (FIG. 1).

TABLE E

Highly branched FIBERSOL ™-2 Texture Study Results

| | Months | | | | | | | | |
|---|---|---|---|---|---|---|---|---|---|
| | 0 | 1 | 2 | 3 | 4 | 5 | 6 | 9 | 12 |
| E1 T1 10DE | 2.00 | 3.48 | 5.39 | 5.72 | 5.84 | 8.97 | 11.10 | 15.39 | 17.92 |
| E1 T2 FS-2 | 0.73 | 1.12 | 1.54 | 1.81 | 1.86 | 2.51 | 3.25 | 4.54 | 4.86 |
| E2 T1 10DE | 2.96 | 4.89 | 8.48 | 13.44 | 12.48 | 16.14 | 18.36 | 26.67 | 26.36 |
| E2 T2 FS-2 | 1.85 | 2.28 | 2.93 | 4.43 | 4.01 | 5.93 | 7.90 | 8.11 | 12.75 |
| E3 T1 10DE | 2.36 | 5.98 | 8.31 | 8.84 | 11.59 | 15.40 | 18.36 | 21.60 | 23.67 |
| E3 T2 FS-2 | 1.07 | 1.63 | 2.55 | 3.65 | 3.84 | 5.62 | 8.07 | 8.54 | 11.04 |

Example 3

Formulations Containing Highly Branched Carbohydrates

FIBERSOL™-2 is highly branched. Another experiment was done to evaluate other highly branched carbohydrates in comparison to FIBERSOL™, including fructo-oligosaccharides (FOS), inulin, 10 DE maltodextrin ("MD"), polydextrose, and Lodex 10 (a highly-branched maltodextrin; Cerestar USA, Hammond, Ind., USA). The control formulation for a 500 gm batch of soy dairy bar formulation is provided in Table F below. To this formulation were added the carbohydrates listed in Table G (below, under "Carbohydrate Bar Types"). The listed ingredients were gradually substituted for highly branched FIBERSOL™-2 in the formulation at a rate of 9.03% total.

TABLE F

Basic Bar Formulation.

| Bar Type | Ingredient | % of total bar wgt | grams |
|---|---|---|---|
| | ADM ProFam 825 | 14.40 | 72.00 |
| | Farbest WPI 900 | 10.82 | 54.12 |
| | Farbest 270 Ca caseinate | 5.41 | 27.06 |
| | Farbest WPC 75 | 5.41 | 27.06 |

TABLE F-continued

Basic Bar Formulation.

| Bar Type | Ingredient | % of total bar wgt | grams |
|---|---|---|---|
| | ADM 62 DE Corn syrup | 36.68 | 183.42 |
| | ADM HFCS 42 | 16.61 | 83.07 |
| | ADM Beakin LV3 | 0.93 | 4.67 |
| | ADM Nu-Sun Oil | 0.70 | 3.48 |

TABLE G

Carbohydrate Bar Types.

| Bar Type | Ingredient | % of total bar wgt | grams |
|---|---|---|---|
| 0% maltodextrin | ADM 10 DE Maltodextrin | 0.00 | 0.00 |
| | highly branched FIBERSOL ™-2 | 9.03 | 45.13 |
| 20% maltodextrin | ADM 10 DE Maltodextrin | 1.81 | 9.03 |
| | highly branched FIBERSOL ™-2 | 7.22 | 36.12 |
| 40% maltodextrin | ADM 10 DE Maltodextrin | 3.61 | 18.06 |
| | highly branched FIBERSOL ™-2 | 5.42 | 27.09 |
| 60% maltodextrin | ADM 10 DE Maltodextrin | 5.42 | 27.09 |
| | highly branched FIBERSOL ™-2 | 3.61 | 18.06 |
| 80% maltodextrin | ADM 10 DE Maltodextrin | 7.22 | 36.12 |
| | highly branched FIBERSOL ™-2 | 1.81 | 9.03 |
| 100% maltodextrin | ADM 10 DE Maltodextrin | 9.03 | 45.13 |
| | highly branched FIBERSOL ™-2 | 0.00 | 0.00 |
| 0% FOS | Fructooligosaccharide | 0.00 | 0.00 |
| | highly branched FIBERSOL ™-2 | 9.03 | 45.13 |
| 100% FOS | Fructooligosaccharide | 9.03 | 45.13 |
| | highly branched FIBERSOL ™-2 | 0.00 | 0.00 |
| 0% Inulin | Inulin | 0.00 | 0.00 |
| | highly branched FIBERSOL ™-2 | 9.03 | 45.13 |
| 100% Inulin | Inulin | 9.03 | 45.13 |
| | highly branched FIBERSOL ™-2 | 0.00 | 0.00 |
| 0% Polydextrose | Polydextrose | 0.00 | 0.00 |
| | highly branched FIBERSOL ™-2 | 9.03 | 45.13 |
| 100% Polydextrose | Polydextrose | 9.03 | 45.13 |
| | highly branched FIBERSOL ™-2 | 0.00 | 0.00 |
| 0% Lodex 10 | Lodex 10 | 0.00 | 0.00 |
| | highly branched FIBERSOL ™-2 | 9.03 | 45.13 |
| 100% Lodex 10 | Lodex 10 | 9.03 | 45.13 |
| | highly branched FIBERSOL ™-2 | 0.00 | 0.00 |

Bar Production Method:

Pre-heat corn syrup in microwave on high for 30 seconds (to about 120° F.).

Pre-mix 62 DE corn syrup and HFCS 42 in Kitchen-Aid™ Mixer on speed 1 for 15 seconds.

While mixing on speed 1, add Beakin LV3 and oil to corn syrup mixture; mix for 30 seconds.

Mix together the proteins and carbohydrate (highly branched FIBERSOL™ and/or maltodextrin, FOS, inulin, polydextrose or Lodex 10) as listed in the "Carbohydrate Bar Types" table above), add one-third of protein/carbohydrate mixture; mix on speed 2 for 30 seconds; scrape; add second-third of mixture; mix for 30 seconds; scrape; add remaining part of mixture; mix for 30 seconds and scrape, and mix for an additional 1 minute at speed 2.

Put in Ziplock™ bag and place in the cooler for 30 minutes.

Form 40 gm increments of based into bar-shapes with the following approximate dimensions; 7.5 cm by 5.5 cm by 1.0 cm (length×width×height).

Package and seal in metallized polyethylene material.

The food bars made according to the above formulations were packaged and stored for 12 months for texture analysis. The results are shown in Table H, below.

TABLE H

Hardness of bars containing highly branched carbohydrates.

| Ingredient | Average hardness | Maximum hardness |
|---|---|---|
| 10 DE Maltodextrin (control) | 30.0 | 50.0 |
| highly branched FIBERSOL ™-2 | 11.1 | 17.4 |
| Fructooligosaccharide (FOS) | 4.3 | 7.5 |
| Inulin | 11.8 | 19.5 |
| Polydextrose | 7.0 | 10.2 |
| Lodex 10 | 15.3 | 22.0 |

In regard to results from this study where we replaced maltodextrin with highly branched FIBERSOL™, it was found that a 20-60% replacement resulted in average hardness of between 15.8-17.5 kg; 80-100% replacement resulted in an average of 11.5 kg force with maltodextrin control have an average of 30 kg force; maximum kg force values for these group were 24.0-26.2, 16.4 & 50.0, respectively.

From the evaluation of various levels of replacement of maltodextrin with highly branched FIBERSOL™, it was found that replacement of as little as 20% of the maltodextrin with highly branched FIBERSOL™ was effective in reducing bar hardening during storage. It was found from this experiment that replacement of 20-60% of the maltodextrin in the nutrition bar with highly branched FIBERSOL™ resulted in a 45-50% reduction in bar hardening, while 80-100% maltodextrin replacement resulted in a 60-65% reduction in hardening.

Inulin and a unique highly branched maltodextrin (Lodex 10DE) performed similarly to highly branched FIBERSOL™ over the twelve month storage period, minimizing bar hardening. Fructooligosaccharide and polydextrose also reduced hardening during bar storage, however, these bars were initially extremely soft and would have made bar manufacture on a commercial basis difficult. Through modification to bar formulations containing fructooligosaccharides and polydextrose, extreme bar softness could be overcome, eliminating bar production issues and allowing for the use of these ingredients as bar softeners.

The reductions in bar hardening found in these studies, which appears to be associated with highly branched carbohydrates, is significant in that the nutrition bars will be perceived by the consumer as having first-day freshness for extended storage periods. This should improve the consumers overall eating experience and result in increased usage of bars made in this way.

While this invention has been particularly shown and described with references to preferred embodiments thereof, it will be understood by those skilled in the art that various changes in form and details may be made therein without departing from the scope of the invention encompassed by the appended claims.

What is claimed is:

1. A food bar having an increased shelf life and protein content, comprising:

(a) a protein-containing ingredient, wherein the protein content makes up greater than 25% of the weight of the food bar;
(b) a carbohydrate-containing ingredient providing at least two carbohydrates; and
(c) a soluble indigestible carbohydrate fiber present in sufficient amount so that an initial firmness of the food bar measured by compression force on a day of formation of the food bar is no more than 63% of initial firmness a control food bar lacking an amount of the soluble indigestible carbohydrate fiber; and so that a subsequent firmness of the food bar measured by compression force 6 months after formation of the food bar is no more than 44% of the subsequent firmness of the control food bar.

2. The food bar of claim 1, wherein the at least two carbohydrates are selected from the group consisting of: corn syrup, tagatose, sucrose, fructose, lactose, maltose, galactose, xylose, dextrose, cyclodextrins, trehalose, raffinose, stachyose, fructooligosaccharide, maltodextrins, starches, pectins, gums, carrageenan, inulin, cellulose based compounds, sugar alcohols, sorbitol, mannitol, maltitol, xylitol, lactitol, isomalt, and erythritol.

3. The food bar of claim 1, wherein the at least two carbohydrates include fructose at up to 30% by total weight of carbohydrates in the food bar.

4. The food bar of claim 1, wherein the soluble indigestible carbohydrate fiber is a highly branched carbohydrate made from a starch.

5. The food bar of claim 4, wherein the soluble indigestible carbohydrate fiber is from about 2% to about 12% by total weight of the food bar.

6. The food bar of claim 1, wherein the food bar comprises a coating.

7. The food bar of claim 6, wherein the coating is selected from the group consisting of: compounded confectionary coating, sugar-free compounded confectionary coating, chocolate coating, carob coating, and yogurt coating.

8. The food bar of claim 1, further comprising one or more components selected from the group consisting of: fruit, nuts, grains, confectionary pieces, and extruded protein based pieces.

9. The food bar of claim 1, wherein the protein-containing ingredient is soy protein.

10. The food bar of claim 1, further comprising at least one additional ingredient selected from the group consisting of: vitamin A, vitamin B, vitamin B2, vitamin B6, vitamin B12, vitamin C, vitamin D, vitamin E, vitamin K, biotin, carnitine, taurine, folic acid, pantothenic acid, niacin, choline, calcium, phosphorus, magnesium, zinc, manganese, copper, sodium, potassium, chloride, iron, selenium, chromium and molybdenum.

11. The food bar of claim 1, further comprising at least one additional ingredient selected from the group consisting of: soy isoflavones, omega-3 fatty acids, sterols, and milled flax seed.

12. The food bar of claim 4, wherein the highly branched carbohydrate comprises FIBERSOL™ 2(E).

13. The food bar of claim 1, wherein up to 30% by total weight of the carbohydrate-containing ingredient is fructose.

14. The food bar of claim 1, wherein the soluble indigestible carbohydrate fiber makes up between about 2% and about 12% of total weight of the food bar.

15. The food bar of claim 1, wherein up to 30% by total weight of the carbohydrate-containing ingredient is fructose; and wherein the soluble indigestible carbohydrate fiber makes up between about 2% and about 12% of a total weight of the food bar.

16. The food bar of claim 1 wherein up to 30% by total weight of the carbohydrate-containing ingredient is fructose; and wherein the soluble indigestible carbohydrate fiber makes up between about 2% and about 12% of a total weight of the food bar.

17. A food bar comprising:
(a) 30-40% by weight of protein;
(b) 50-60% by weight of carbohydrate from at least two carbohydrates; and
(c) 2-10% by weight of a softener consisting essentially of an soluble indigestible carbohydrate fiber; wherein the soluble indigestible carbohydrate fiber is present in a sufficient amount so that an initial firmness of the food bar measured by compression force on a day of formation of the food bar is no more than 63% of the initial firmness of a control food bar lacking the amount of indigestible carbohydrate fiber; and so that a subsequent firmness of the food bar measured by compression force 6 months after formation of the food bar is no more than 44% of the subsequent firmness of the control food bar.

18. The food bar of claim 17, wherein the soluble indigestible carbohydrate fiber comprises a highly branched carbohydrate.

19. A process for manufacturing a food bar, comprising
(a) combining an soluble indigestible carbohydrate fiber, a protein source that will account for at least 25% by weight of the food bar, and at least two carbohydrates in a mixture, wherein an amount of soluble indigestible carbohydrate fiber is in a sufficient amount so that an initial firmness of the food bar measured by compression force on the day of formation of the food bar is no more than 63% of the initial firmness a control food bar lacking the amount of indigestible carbohydrate fiber; and so that a subsequent firmness of the food bar measured by compression force 6 months after formation of the food bar is no more than 44% of the subsequent firmness of the control food bar; and
(b) forming the mixture into a food bar.

20. The process of claim 19, wherein the soluble indigestible carbohydrate fiber is a highly branched carbohydrate.

21. The process of claim 20, wherein the highly branched carbohydrate is about 2 to about 12% of total weight of the food bar.

22. The food bar of claim 1, wherein the protein-containing ingredient is 30-40% by weight.

23. The food bar of claim 1, wherein the carbohydrate-containing ingredient providing at least two carbohydrates is 50-60% by weight.

24. The food bar of claim 1, wherein the soluble indigestible carbohydrate fiber is 2-10% by weight.

* * * * *